US010334787B2

(12) United States Patent
Humbert et al.

(10) Patent No.: US 10,334,787 B2
(45) Date of Patent: Jul. 2, 2019

(54) DEVICE FOR CONTROLLING THE OUTLET FLAP OF A BALER AND METHOD THEREOF

(71) Applicant: DEERE & COMPANY, Moline, IL (US)

(72) Inventors: Clement Humbert, Quingey (FR); Jean-Alexis Mercier, Chatelperron (FR)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 16/044,540

(22) Filed: Jul. 25, 2018

(65) Prior Publication Data

US 2019/0037775 A1    Feb. 7, 2019

(30) Foreign Application Priority Data

Aug. 2, 2017    (DE) .................... 10 2017 213 436

(51) Int. Cl.
   *A01F 15/08*      (2006.01)
   *F15B 13/04*      (2006.01)
   *F15B 15/14*      (2006.01)

(52) U.S. Cl.
   CPC ...... *A01F 15/0883* (2013.01); *F15B 13/0401* (2013.01); *F15B 13/0416* (2013.01);
   (Continued)

(58) Field of Classification Search
   CPC ...... A01F 15/07; A01F 15/08; A01F 15/0883; A01F 2015/076; B30B 9/30; B30B 15/00;
   (Continued)

(56) References Cited

U.S. PATENT DOCUMENTS 5,622,104 A * 4/1997 Viesselmann .......... A01F 15/07
                                                      100/88
6,272,825 B1 * 8/2001 Anderson ............ A01F 15/085
                                                      100/88
(Continued)

FOREIGN PATENT DOCUMENTS

AU     2012307238 B2    10/2016
DE        10303201 A1     8/2004
(Continued)

OTHER PUBLICATIONS

German Search Report issued in counterpart application No. 102017213436.4 dated Aug. 2, 2018. (10 pages).
(Continued)

*Primary Examiner* — Jimmy T Nguyen

(57) ABSTRACT

A device for controlling an outlet flap of a baler in at least one manual and one automatic mode includes an outlet flap drive, a first and a second pressure line via which the outlet flap drive is selectively charged with pressure, a first pressure measuring apparatus operatively connected to the first pressure line, and a second pressure measuring apparatus operatively connected to the second pressure line. A distributor valve is connected to the first and second pressure lines downstream of the first and second pressure measuring apparatus. The distributor valve is disposable in a first pass-through position, a second pass-through position, and a shut-off position. In an automatic mode, the distributor valve is disposed in a predetermined position dependent on a pressure difference between the pressures in the first and second pressure lines.

20 Claims, 2 Drawing Sheets

(52) U.S. Cl.
CPC ...... *F15B 15/14* (2013.01); *F15B 2013/0412* (2013.01); *F15B 2211/50563* (2013.01)

(58) Field of Classification Search
CPC ...... B30B 15/16; F15B 15/14; F15B 13/0401; F15B 13/0416; F15B 2013/0412; F15B 2211/50563
USPC ...................................... 100/87, 88; 56/341
See application file for complete search history.

(56) References Cited

U.S. PATENT DOCUMENTS

| | | | |
|---|---|---|---|
| 7,472,649 B1 * | 1/2009 | Derscheid | A01F 15/0883 100/7 |
| 7,849,791 B2 * | 12/2010 | Smith | A01F 15/08 100/88 |
| 9,107,348 B2 * | 8/2015 | Smith | A01F 15/0883 |
| 2007/0234908 A1 | 10/2007 | Hines et al. | |

FOREIGN PATENT DOCUMENTS

| | | |
|---|---|---|
| EP | 1444882 A2 | 8/2004 |
| EP | 2042028 A1 | 4/2009 |
| EP | 2923560 A1 | 9/2015 |
| EP | 3150061 A1 | 4/2017 |

OTHER PUBLICATIONS

European Search Report issued in counterpart application No. 18183011.8 dated Dec. 20, 2018. (6 pages).

\* cited by examiner

DEVICE FOR CONTROLLING THE OUTLET FLAP OF A BALER AND METHOD THEREOF

RELATED APPLICATIONS

This application claims priority to German Patent Application Ser. No. 102017213436.4, filed Aug. 2, 2017, the disclosure of which is hereby incorporated by reference in its entirety.

FIELD OF THE DISCLOSURE

The present disclosure relates to a device for controlling the outlet flap of a baler in at least one manual and one automatic mode, and to a method for controlling the outlet flap of a baler.

BACKGROUND

Known devices for controlling the outlet flap of a baler are used to control an outlet flap of the baler such that the outlet flap is closed at least during a bale formation process in a pressing chamber of the baler and, after the completion of the bale formation process, makes it possible for a bale formed in the pressing chamber of the baler to exit or be ejected from the pressing chamber in order to thereafter, for example, be set down on the ground or transferred to a further device such as, for example, a wrapping device. A known device is presented in EP-A1-2042028.

Such balers are used both in the agricultural sector and in the industrial sector. Corresponding agricultural balers serve, for example, for the formation of crop bales, i.e., in the form of round bales, and commonly generate at least substantially round cylindrical bales from crop such as straw, hay, chaff, etc. Industrial balers are used in the compaction of refuse, textiles or other materials or in the pressing thereof to form bales.

Known devices for controlling the outlet flap of a baler are normally complex. Simple devices often do not permit operation in an automatic mode. If an automatic mode is provided, it may be for an emergency situation that manual intervention by an operating person, or a spontaneous return of the device into a manual mode, is possible only with difficulty or is not possible. In particular, such a device normally cannot be actuated directly by means of a control valve of a tractor vehicle.

Thus, there is a need for a simpler device for controlling the outlet flap of a baler, a baler, and a method for controlling the outlet flap of a baler.

SUMMARY

In a first embodiment of the present disclosure, a device for controlling the outlet flap of a baler in at least one manual and one automatic mode has a first and a second pressure line via which an outlet flap drive can be selectively charged with pressure. To the pressure lines, there are operatively connected pressure measuring means which are suitable for determining a pressure respectively prevailing in the pressure line. To the pressure lines, downstream of the pressure measuring means, there is connected a distributor valve which has at least one first and one second pass-through position and a shut-off position. In the at least one automatic mode, the distributor valve assumes a predetermined position (first, second pass-through position or shut-off position) in a manner dependent on the value of a pressure difference between the determined pressures. In this way, the distributor valve can, regardless of which of the pressure lines is charged with pressure, assume the predetermined position in which, in turn, the outlet flap drive is charged with pressure in accordance with a desired or demanded, required movement of the outlet flap. The value of the pressure difference may in this case be equivalent to the flow direction of a pressure medium in the device or in the pressure lines of the device.

In a first pass-through position, the distributor valve will charge the outlet flap drive with pressure such that the outlet flap drive moves the outlet flap into a first position in which it at least substantially closes a pressing chamber of the baler, and, in a second pass-through position, the distributor valve will charge the outlet flap drive with pressure such that the outlet flap drive moves the outlet flap into a second position in which it opens up an opening through which a bale can exit the pressing chamber. Here, the first pass-through position, in the automatic mode, corresponds to a value of the pressure difference with a first, in particular positive or negative, sign and the second pass-through position corresponds to a value of the pressure difference with an opposite sign in relation to the first sign, whereby the distributor valve assumes a predetermined position independently of the flow direction of a pressure medium in the pressure lines or independently of which of the pressure lines is charged with pressure upon activation of the automatic mode.

The pressure lines may be designed so as to be directly or indirectly connectable to a control valve of a tractor vehicle. The control valve is connected to a pressure source such that the control valve can either charge the first or the second pressure line with pressure or can assume a shut-off position in which neither of the pressure lines is charged with pressure. In this way, the device can be actuated by means of an at least substantially conventional control valve, such as is commonly provided on tractor vehicles such as, for example, agricultural tractors. The pressure source may be a separate pressure source independent of the baler, or may be a pressure source that interacts on or with the baler. It is however particularly expedient for the pressure source to be provided on the tractor vehicle or to be formed by a pressure source of the tractor vehicle.

The automatic mode is activatable only when the value of the pressure difference is not at least approximately zero or the control valve does not assume its shut-off position. It is particularly expedient if the automatic mode is automatically deactivatable, in particular as soon as the value of the pressure difference is at least approximately zero or the control valve assumes its shut-off position. In this way, an operating person can directly or easily influence the device when it is in the automatic mode and perform manual control of the outlet flap of the baler, for example, by actuating a joystick, or some other control means, that is operatively connected to the control valve or moving the joystick or other control means into a neutral position that corresponds to the shut-off position of the control valve.

If the outlet flap drive has at least one hydraulic motor, the hydraulic motor may include a cylinder and a piston. In the cylinder, the piston can be moved by exertion of pressure at least into a retracted position and a deployed position in relation to the cylinder. Alternatively, the outlet flap drive may be designed as a hydraulic motor of the type such that the piston can be correspondingly charged with pressure via the pressure lines such that the piston can move the outlet flap or bring the outlet flap into its first and second position. In particular, the outlet flap drive interacts with the outlet flap such that the outlet flap drive pivots the outlet flap, in particular with respect to the baler or a frame of the baler, about a horizontally oriented pivot axis.

It is particularly expedient if a control unit is provided for the direct or indirect actuation at least of the distributor valve. The control unit may be provided independently, though may also be part of a control unit of the baler or of the tractor vehicle or formed by a control unit of the type.

If an actuating device is provided for the selection of at least one manual and one automatic mode, the actuating device may be operatively connectable to the control unit. The actuating device may for example be an actuation switch or button. This may be provided separately or else may be integrated into the control device or a control panel of the tractor vehicle or of the baler.

If a baler having an outlet flap which, by means of an outlet flap drive, can be moved at least into a first position, in which the outlet flap at least substantially closes the pressing chamber of the baler, and can be moved into a second position, in which the outlet flap opens up an opening through which a bale can exit the pressing chamber of the baler, has an above-described device for actuating the outlet flap, then the baler can be operated in a manual and in an automatic mode. Here, the distributor valve can, in the automatic mode, be actuated so as to assume a predetermined position in a manner dependent on the value or a sign of the value of the pressure difference between the pressures prevailing in the pressure lines. Such balers are used both in the agricultural sector and in the industrial sector. The baler is in particular an agricultural baler for forming round cylindrical bales. The baler may, however, also be used in the industrial sector, for example, for forming bales from paper, refuse, fabric or other materials. The pressing chamber of the baler may be provided so as to be of unchanging size or changeable size or variable, wherein pressing means may be provided in the form of pressing rollers or else pressing belts or other suitable means or a combination of these. The baler may furthermore or alternatively also be formed as a combination apparatus which may have further functions in addition to the pressing function. For example, it may be provided that the bale that is formed in the pressing chamber is bound or is wrapped or encased with a material such as, for example, a film or a mesh.

In a method for controlling the outlet flap of a baler as described above in at least one manual and one automatic mode, the pressure measuring means determines a pressure respectively prevailing in the pressure line, whereupon the distributor valve, at least in the at least one automatic mode, assumes a predetermined position in a manner dependent on the value of a difference between the determined pressures.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
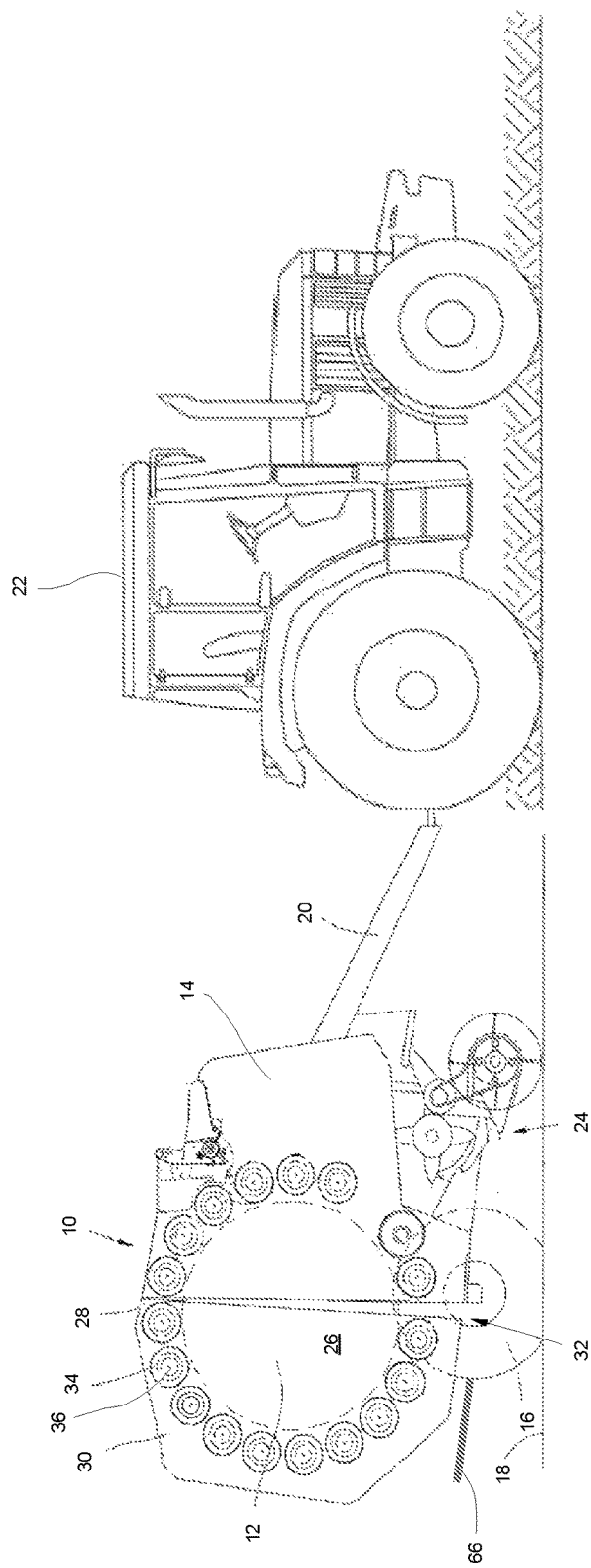
FIG. 1 is a schematic side view of a baler hitched to a tractor vehicle.

FIG. 1 shows a schematically illustrated baler 10 in the form of an agricultural round baler for the pressing of a round cylindrical bale 12. The baler has a housing part 14 which is supported by means of wheels 16 on the ground 18 and which is connectable by means of a drawbar 20 to a tractor vehicle 22 such as, for example, an agricultural tractor.

At a bottom side, at the front in relation to a forward direction of travel, of the housing part 14, there is situated in a known manner a pick-up device 24 for picking up and feeding crop. The pick-up device conveys cut crop into a pressing chamber 26, wherein the housing part 14 surrounds a front part of the pressing chamber 26. At the rear upper corner region of the first housing part 14, there is situated a bearing 28 for a pivotable outlet flap 30 which forms a second housing part and which surrounds a rear part of the pressing chamber 26. In the open state, the outlet flap 30 opens up an opening 32 through which a bale 12 that has been pressed by the baler 10 can be set down, unloaded or ejected.

In the present embodiment, the pressing chamber 26 of the baler 10 is designed to be of unchanging size, and the baler 10 has a multiplicity of pressing rollers 34 which run parallel to one another (by way of example, only a few pressing rollers 34 have been denoted by the reference designation 34 here), the roller axes 36 of which pressing rollers lie on a circular arc when the second housing part 24 is closed, and at least some of which pressing rollers are driven. The pressing rollers 34 serve not only for pressing and shaping but in particular also for generating a rotation or maintaining a rotation of the round bale 12 arranged in the pressing chamber 26. Here, by way of example, the baler 10 is depicted with the outlet flap 30 slightly open in order to illustrate the opening 32.

Figure 2:
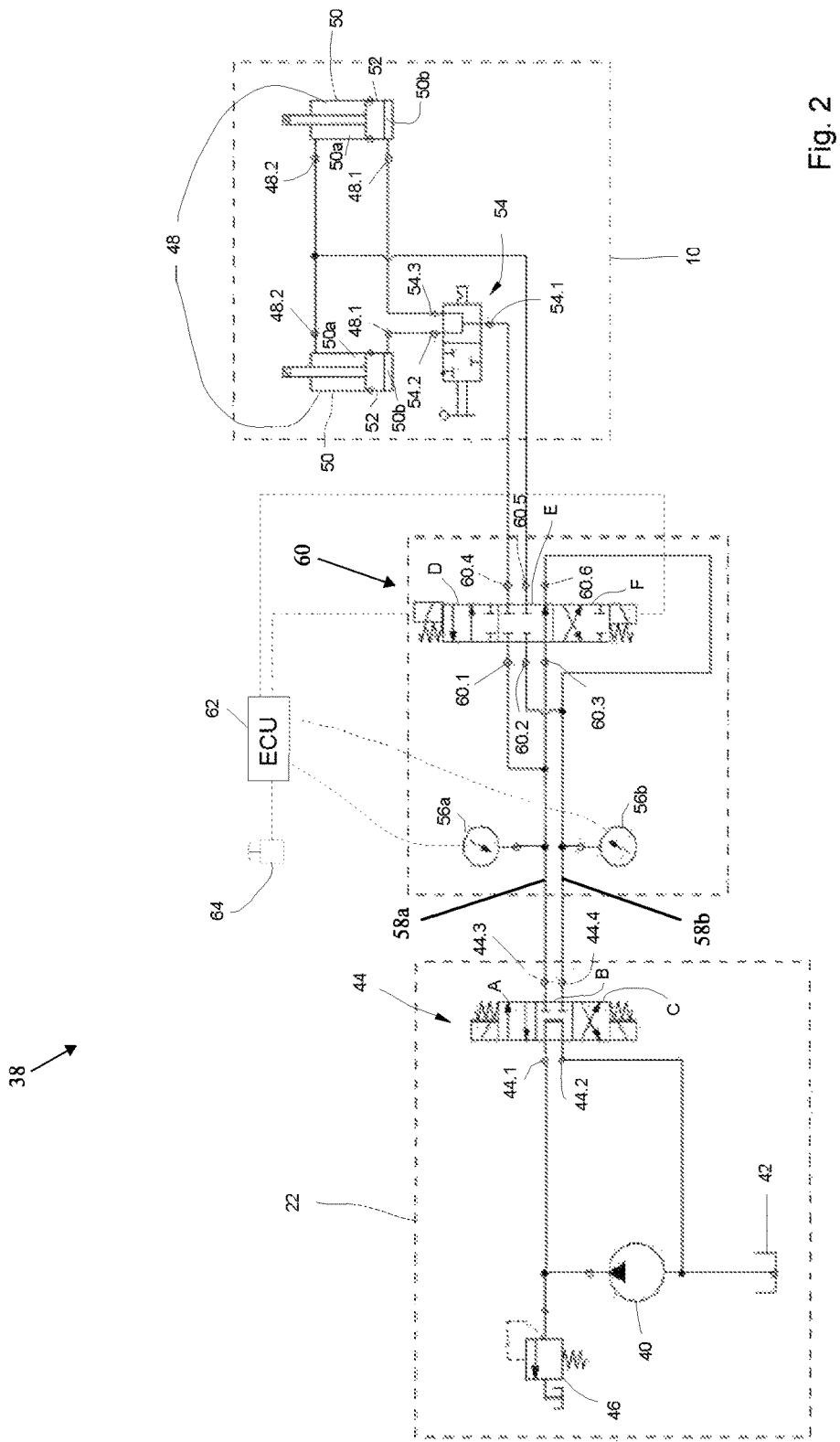
FIG. 2 is a schematic hydraulic diagram of a device for controlling an outlet flap of a baler.

Reference is now made to FIG. 2, which schematically illustrates a device 38 for controlling the outlet flap 30 in at least one manual and one automatic mode. In the present embodiment, a pressure source 40 is provided, which may be a hydraulic pump of the tractor vehicle 22. The pressure source 40 is connected in a conventional manner to a pressure medium reservoir 42 of the tractor vehicle 22 and, via a control valve 44, which in this case is designed as an electromagnetically actuatable 4/3 directional valve with four ports 44.1, 44.2, 44.3 and 44.4. The pressure source 40 provides a hydraulic pressure for attachments that are connectable to the tractor vehicle 22 such as, for example, the baler 10 described herein. Furthermore, a pressure relief valve 46 is provided in the control device 38, which pressure relief valve opens if, in the hydraulic circuit of the control device 38, a pressure prevails which exceeds a defined maximum pressure.

Two jointly actuatable pivoting drives or outlet flap drives 48 are provided on the baler for the actuation of the pivotable outlet flap 30, which pivoting drives or outlet flap drives are formed in a known manner as double-acting hydraulic motors and have first ports 48.1 and second ports 48.2. It is, however, also conceivable for only one outlet flap drive 48 or only one hydraulic motor to be provided. The outlet flap drives 48 have in each case one cylinder 50 and one piston 52 which is displaceable in the cylinder 50, wherein the piston 52 divides the cylinder 50 into a first and a second cylinder region 50a, 50b. Positioned upstream of the outlet flap drives 48 is a lockable shut-off valve 54, which in the present embodiment is manually actuatable and which has ports 54.1, 54.2 and 54.3 and by means of which a hydraulic flow to and from the pivoting drives 48 via the ports 48.1 and 48.2 thereof can be permitted or prevented.

The control valve 44 can selectively assume a position A, B or C, wherein, in the first position A, a pressure line 58*a* which has a first pressure measuring means 56*a* is charged with pressure via the ports 44.1 and 44.2. If the control valve 44 assumes its third position C, then a second pressure line 58*b*, which likewise has a pressure measuring means 56*b*, is charged with pressure via the ports 44.1 and 44.4. If the control valve 44 assumes its central position or its shut-off position B, a hydraulic flow is prevented, or neither of the pressure lines 58*a, b* is charged with pressure.

Furthermore, an outlet flap valve or distributor valve 60 is provided which is designed as an electromagnetically actuatable 6/3 directional valve and which has six ports 60.1, 60.2, 60.3, 60.4, 60.5 and 60.6. The distributor valve 60 is provided between the pressure measuring means 56*a, b* and the shut-off valve 54 and can assume three positions, a first pass-through position D, a shut-off position E and a second pass-through position F. In its first pass-through position D, the distributor valve 60, via its ports 60.1 and 60.4, connects the first pressure line 58*a* to the first port 54.1 of the shut-off valve 54 and, via the second ports 54.2 and 54.3 of the shut-off valve 54, to the first ports 48.1 of the pivoting drives 48. Via the ports 60.2 and 60.5, a connection is produced between the second ports 48.2 of the outlet flap drives 48 and the second pressure line 58*b*. In the shut-off position E of the distributor valve, a hydraulic flow to and from the outlet flap drives 48 is prevented, and a connection is produced between the pressure lines 58*a* and 58*b* via the ports 60.3 and 60.6. In the second pass-through position F, a connection is produced via the ports 60.1 and 60.5 to the first port 54.1 of the shut-off valve 54 and via the second ports 54.2 and 54.3 of the shut-off valve 54 to the first ports 48.1 of the outlet flap drives 48. The second ports 48.2 of the outlet flap drives 48 are connected to the second pressure line 58*b* via the ports 60.2 and 60.4.

Furthermore, an open-loop or closed-loop control unit 62 for the open-loop or closed-loop control of individual or multiple functions or processes of the baler 10 is provided, by means of which the control unit the distributor valve 60 can be actuated. The control unit 62 is operatively connected to an actuating device 64 for activating or deactivating an automatic mode of the outlet flap 30, and furthermore to the pressure measuring means 56*a, b*.

The functioning of the device 38 described above will be discussed in more detail below.

The baler 10 can be operated in a manual and an automatic mode, which can be selected by an operating person by means of the actuating device 64, which may be arranged in a cabin of the tractor vehicle 22.

In the manual mode, a neutral state is provided in which the control valve 44 assumes its shut-off position B and the distributor valve 60 assumes its first pass-through position D. In this neutral state, neither of the pressure lines 58*a, b* is charged with pressure.

To open the outlet flap 30, the control valve 44 is actuated in a known manner and assumes its position A, in which the pressure line 58*a* is charged with pressure. The distributor valve 60 is situated, unchanged, in its first pass-through position D, whereby the port 48.1 of the outlet flap drive 48 is charged with pressure and the pistons 52 of the outlet flap drives 48 are deployed in relation to the cylinders 50 in order to open the outlet flap 30. Pressure medium situated in those regions 48*b* of the cylinders 50 which are now not charged with pressure can flow out in the direction of the pressure medium reservoir 42 via the ports 48.2.

To close the outlet flap 30, the control valve 44 is actuated such that it assumes its position C and the ports 48.2 of the outlet flap drives 48 are charged with pressure via the pressure line 58*b* and via the distributor valve 60, which is still situated in its first pass-through position D such that the pistons 52 of the outlet flap drives 48 are retracted in relation to the cylinders 50 in order to close the outlet flap 30. Pressure medium situated in those regions 50*a* of the cylinders 50 which are now not charged with pressure can now flow out in the direction of the pressure medium reservoir 42.

To operate the baler 10 or the control device 38 in an automatic mode, the control valve 44 is moved into one of its active positions A or C, in which one of the pressure lines 58*a* or *b* is charged with pressure.

Subsequently, by actuation of the actuation switch 64, the automatic mode can be activated. Here, the control device 38 initially assumes a neutral state, in which the distributor valve 60 is situated in its shut-off position E. The pressure measuring means 56*a* and *b*, respectively, now determine a pressure prevailing in the pressure lines 58*a* and *b*, respectively, and transmit this information to the control device 62. Furthermore, information regarding the present state of the baler 10 is available in a known manner to the control device 62, in particular information regarding whether a bale 12 situated in the baler 10 should be released from the pressing chamber 26, for example, because a bale formation, bale binding, or bale wrapping process has been completed.

If information is available to the control device 62 to the effect that the bale 12 should be released from the pressing chamber 26, the control device actuates the distributor valve 60 in a manner dependent on a pressure difference prevailing between the pressure measuring means 56*a* and *b*, such that the distributor valve assumes its first pass-through position D, if the control valve 44 is situated in its position A and thus a higher pressure prevails at the pressure measuring means 56*a* or in the pressure line 58*a* than at the pressure measuring means 56*b* or in the pressure line 58*b*. However, if, upon activation of the automatic mode, the control valve 44 is situated in its position C, a higher pressure prevails in the pressure line 58*b* or at the pressure measuring means 56*b* than in the pressure line 58*a* or at the pressure measuring means 56*a*, and the control device 62 actuates the distributor valve 60 such that the latter assumes its second pass-through position F. Correspondingly, the pressure source 40 charges the regions 50*a* of the cylinders 50 with pressure. The pistons 52 are now deployed in relation to the cylinders 50 and, in the embodiment shown, pivot the outlet flap 30 upward. The outlet flap now opens up the opening 32, and the bale 12 can exit the pressing chamber 26.

If it is sought to close the outlet flap 30 (again) because the bale 12 has exited the pressing chamber 26, which may be determined, for example, by means of one or more corresponding sensors (e.g., pressure or contact sensors) arranged on an unloading ramp 66 (see FIG. 1) of the baler 10, then the control device 62 actuates the distributor valve 60 such that the latter assumes its position F. If the control valve 44 is situated in its position A, a higher pressure prevails in the pressure line 58*a*, at the pressure measuring means 56*a* than in the pressure line 58*b*, or at the pressure measuring means 56*b*. However, if the control valve 44 is situated in its position C and thus a higher pressure prevails in the pressure line 58*b* or at the pressure measuring means 56*b* than in the pressure line 58*a* or at the pressure measuring means 56a, then the control device 62 actuates the distributor valve 60 such that the latter assumes its position A.

If operation in the automatic mode is no longer desired, this mode can be deactivated by virtue of the operating person correspondingly actuating the actuation switch 64 or moving the actuation switch into a corresponding position. It is additionally or alternatively provided that the control device 38 returns into the manual mode if the control valve 44, during operation in the automatic mode, is moved, possibly even only briefly, into its shut-off position B in which it prevents a pressure medium flow from the pressure source 42 to the distributor valve 60. The pressure measuring means 56a, b then no longer determine a pressure difference between the pressures prevailing in the pressure lines 58a, b, and the control device 62 actuates the distributor valve 62 such that the latter assumes its position A, and thus the control arrangement 38 assumes the above-described neutral state of the manual mode. This may be expedient in particular if the baler 10 is being used on land with different types of terrain such as, for example, land with alternating hills and flat regions of land. Here, as well as in an emergency situation, it may be important or helpful for an operating person to be able to quickly or briefly obtain (regain) manual control over a release of the bale from the pressing chamber or over a closure or opening of an outlet flap.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A device for controlling an outlet flap of a baler in at least one manual and one automatic mode, comprising:
   an outlet flap drive;
   a first and a second pressure line via which the outlet flap drive is selectively charged with pressure;
   a first pressure measuring means operatively connected to the first pressure line and a second pressure measuring means operatively connected to the second pressure line, the first and second pressure measuring means configured to determine a pressure in each respective pressure line; and
   a distributor valve connected to the first and second pressure lines downstream of the first and second pressure measuring means;
   wherein, the distributor valve comprises at least a first pass-through position, a second pass-through position, and a shut-off position;
   wherein, in the at least one automatic mode, the distributor valve is disposed in a predetermined position dependent on a pressure difference between the pressures in the first and second pressure lines.

2. The device of claim 1, wherein:
   in the first pass-through position, the distributor valve operably charges the outlet flap drive with pressure such that the outlet flap drive moves the outlet flap into a first position in which it at least substantially closes a pressing chamber of the baler; and
   in the second pass-through position, the distributor valve charges the outlet flap drive with pressure such that the outlet flap drive moves the outlet flap into a second position in which it opens up an opening through which a bale can exit the pressing chamber.

3. The device of claim 2, wherein, in the automatic mode, the first pass-through position corresponds to a pressure difference comprising a first sign and the second pass-through position corresponds to a pressure difference comprising an opposite sign in relation to the first sign.

4. The device of claim 1, wherein the first and second pressure lines are configured to be connectable to a control valve of a tractor vehicle, the control valve being connected to a pressure source such that the control valve charges either the first or the second pressure line with pressure or is disposed in a shut-off position in which neither of the pressure lines is charged with pressure.

5. The device of claim 4, wherein:
   the automatic mode is activatable only when the pressure difference is not approximately zero or the control valve is not in its shut-off position.

6. The device of claim 4, wherein the automatic mode is automatically deactivatable when the pressure difference is approximately zero or the control valve is in its shut-off position.

7. The device of claim 1, wherein:
   the outlet flap drive comprises a hydraulic motor including a cylinder and a piston;
   the piston being movable in the cylinder by exertion of pressure between a retracted position and a deployed position.

8. The device of claim 1, further comprising a control unit for operably actuating the distributor valve.

9. The device of claim 8, further comprising an actuating device for operably selecting between at least one manual and one automatic mode, the actuating device being operatively connectable to the control unit.

10. A baler, comprising:
    a pressing chamber comprising an opening;
    an outlet flap movable between at least a first position and a second position;
    an outlet flap drive for operably moving the outlet flap between the first and second positions, where in the first position the outlet flap at least substantially closes the opening in the pressing chamber, and in the second position the outlet flap at least partially opens the opening through which a bale can exit the pressing chamber; and
    a device for controlling the outlet flap in at least one manual and one automatic mode, the device comprising:
       a first and a second pressure line via which the outlet flap drive is selectively charged with pressure;
       a first pressure measuring means operatively connected to the first pressure line and a second pressure measuring means operatively connected to the second pressure line, the first and second pressure measuring means configured to determine a pressure in each respective pressure line; and
       a distributor valve connected to the first and second pressure lines downstream of the first and second pressure measuring means;
       wherein, the distributor valve comprises at least a first pass-through position, a second pass-through position, and a shut-off position;
       wherein, in the at least one automatic mode, the distributor valve is disposed in a predetermined position dependent on a pressure difference between the pressures in the first and second pressure lines.

11. The baler of claim 10, wherein:
- in the first pass-through position, the distributor valve operably charges the outlet flap drive with pressure such that the outlet flap drive moves the outlet flap into a first position in which it at least substantially closes a pressing chamber of the baler; and
- in the second pass-through position, the distributor valve charges the outlet flap drive with pressure such that the outlet flap drive moves the outlet flap into a second position in which it opens up an opening through which a bale can exit the pressing chamber.

12. The baler of claim 11, wherein, in the automatic mode, the first pass-through position corresponds to a pressure difference comprising a first sign and the second pass-through position corresponds to a pressure difference comprising an opposite sign in relation to the first sign.

13. The baler of claim 10, wherein the first and second pressure lines are configured to be connectable to a control valve of a tractor vehicle, the control valve being connected to a pressure source such that the control valve charges either the first or the second pressure line with pressure or is disposed in a shut-off position in which neither of the pressure lines is charged with pressure.

14. The baler of claim 13, wherein:
- the automatic mode is activatable only when the pressure difference is not approximately zero or the control valve is not in its shut-off position.

15. The baler of claim 13, wherein the automatic mode is automatically deactivatable when the pressure difference is approximately zero or the control valve is in its shut-off position.

16. The baler of claim 10, wherein:
- the outlet flap drive comprises a hydraulic motor including a cylinder and a piston;
- the piston being movable in the cylinder by exertion of pressure between a retracted position and a deployed position.

17. The baler of claim 10, further comprising a control unit for operably actuating the distributor valve.

18. The baler of claim 17, further comprising an actuating device for operably selecting between at least one manual and one automatic mode, the actuating device being operatively connectable to the control unit.

19. A method for controlling an outlet flap of a baler in at least one manual and one automatic mode, comprising:
- providing an outlet flap drive, a first and a second pressure line via which the outlet flap drive is selectively charged with pressure; a first pressure measuring means operatively connected to the first pressure line and a second pressure measuring means operatively connected to the second pressure line, and a distributor valve connected to the first and second pressure lines downstream of the first and second pressure measuring means;
- determining a first pressure in the first pressure line via the first pressure measuring means;
- determining a second pressure in the second pressure line via the second pressure measuring means;
- positioning the distributor valve in a predetermined position in the at least one automatic mode based on a difference between the first pressure and the second pressure.

20. The method of claim 19, further comprising positioning the distributor valve in one of a first pass-through position, a second pass-through position, and a shut-off position.

* * * * *